United States Patent [19]
Spatafora et al.

[11] Patent Number: 5,729,959
[45] Date of Patent: Mar. 24, 1998

[54] METHOD AND APPARATUS FOR PACKAGING A SERIES OF PRODUCTS IN A TUBE OF FILM INCLUDING PREHEATING AREAS OF FILM WHICH ARE TO BE CONNECTED FOR SEALING ABOUT OR BETWEEN PRODUCTS

[75] Inventors: Mario Spatafora, Bologna; Andrea Berti, Castel S. Pietro Terme, both of Italy

[73] Assignee: Azionaria Costruzioni Macchine Automatiche S.p.A., Bologna, Italy

[21] Appl. No.: 744,578

[22] Filed: Nov. 6, 1996

[30] Foreign Application Priority Data

Nov. 7, 1995 [IT] Italy ............... BO95A0522

[51] Int. Cl.$^6$ ........................ B65B 9/00
[52] U.S. Cl. .............. 53/450; 53/477; 53/550; 53/373.7; 53/375.9
[58] Field of Search ............. 53/477, DIG. 2, 53/450, 550, 373.7, 375.8, 375.9; 430/942, 944, 945

[56] References Cited

U.S. PATENT DOCUMENTS

| | | |
|---|---|---|
| 3,926,306 | 12/1975 | Van Nederveen .............. 53/432 |
| 4,876,842 | 10/1989 | Ausnit ............................ 53/450 |
| 5,467,580 | 11/1995 | Francioni ....................... 53/550 |
| 5,502,706 | 3/1996 | Yang et al. ................... 430/942 |
| 5,548,946 | 8/1996 | Holub ............................. 53/550 |
| 5,573,894 | 11/1996 | Kodama et al. ............. 430/944 |

FOREIGN PATENT DOCUMENTS

| | | |
|---|---|---|
| 461 689 | 12/1991 | European Pat. Off. . |
| 2 027 407 | 2/1980 | United Kingdom . |
| 82/02352 | 7/1982 | WIPO . |

*Primary Examiner*—James F. Coan
*Assistant Examiner*—Gene L. Kim
*Attorney, Agent, or Firm*—Cushman Darby & Cushman IP Group of Pillsbury Madison & Sutro, LLP

[57] ABSTRACT

A method and an equipment for the sealing of a film of material for wrapping for product, according to which film, wrapped about the products, which are fed in ordered sequence and arranged at predetermined intervals along a packaging line in order to form a tubular envelope having two specific parts respectively defined by two overlapped longitudinal edges and two opposed walls included between two adjacent products and destined to be connected by means of a heat seal, is pre-heated at the specific parts brushing them by means of a beam of radiant electromagnetic energy.

19 Claims, 2 Drawing Sheets

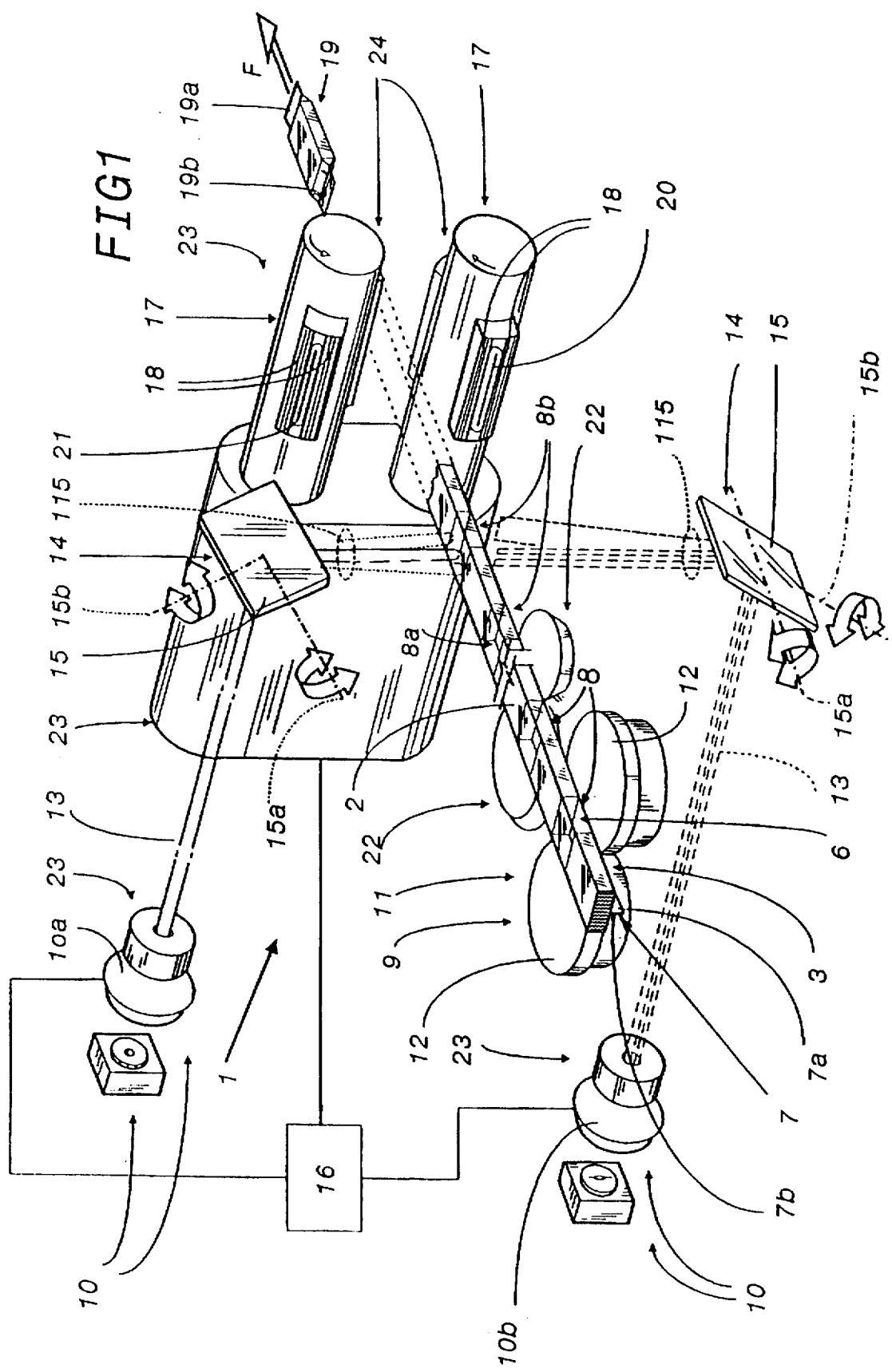

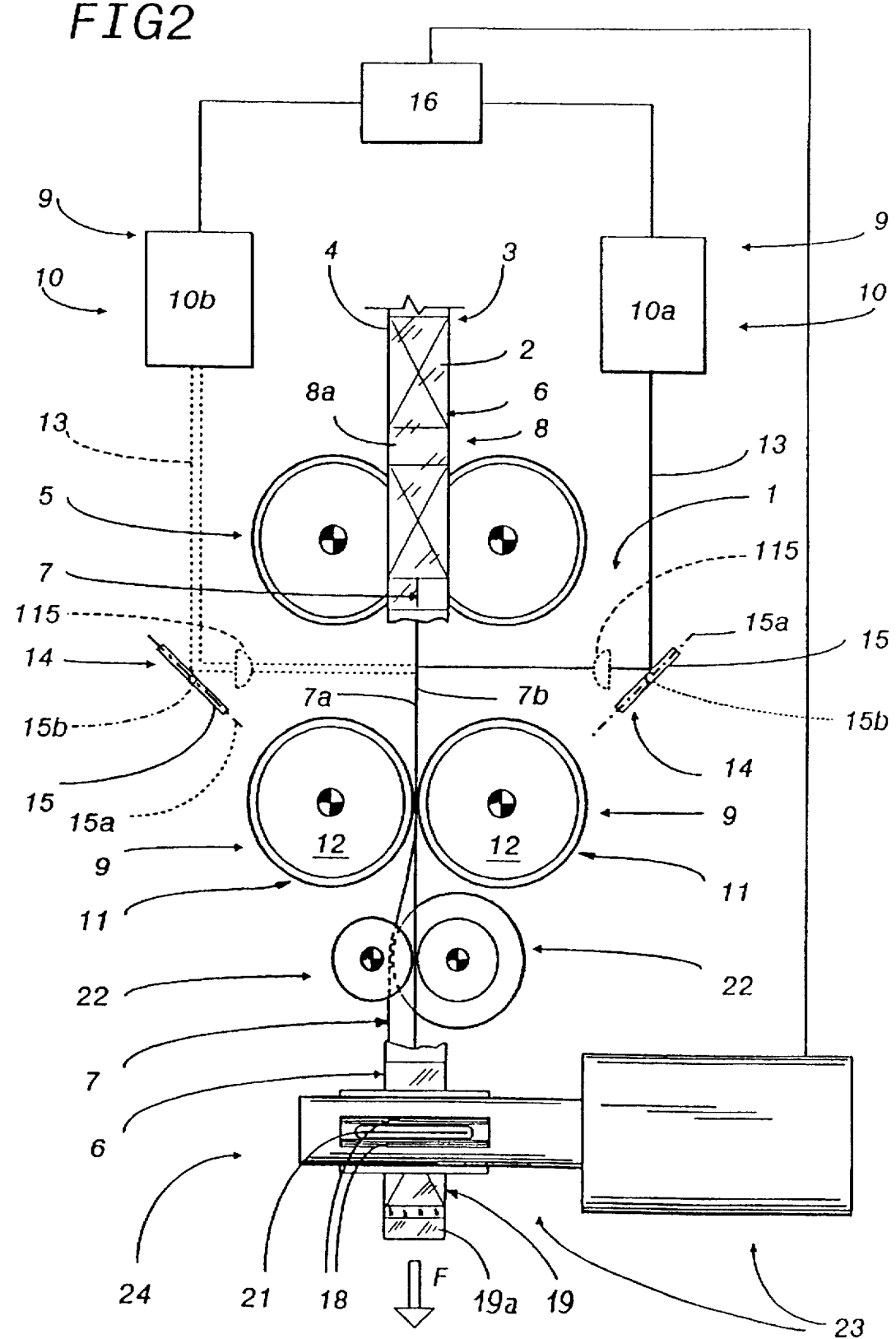

METHOD AND APPARATUS FOR PACKAGING A SERIES OF PRODUCTS IN A TUBE OF FILM INCLUDING PREHEATING AREAS OF FILM WHICH ARE TO BE CONNECTED FOR SEALING ABOUT OR BETWEEN PRODUCTS

BACKGROUND OF THE INVENTION

The present invention relates to a method for the sealing of a film of wrapping material. In particular, the present invention relates to a method for the sealing of specific parts of a film of material for wrapping products in packaging machines, which products are fed in ordered sequence and arranged at constant intervals determined along a packaging line, and each inside an envelope which is given a tubular shape equipped with two overlapped longitudinal edges obtained by folding the film about each product. The reciprocal sealing of the above-mentioned specific parts of the film permits one to obtain a sequence of single envelopes hermetically sealed both longitudinally along the longitudinal edges and transversally on the respective end parts, enclosing, each, one respective product.

At present, along the advancement path of the packaging line, are envisaged one or more pairs of sealing rollers, which are positioned by apposed bands of the longitudinal edges, which heat and compress the longitudinal edges until their reciprocal sealing is achieved, and there also being provided a cutting and sealing unit equipped with a pair of opposed rollers which extend transversally, and from bands opposed to the advancement path.

Each roller of the cutting and sealing unit is equipped with at least a first and second cutting and sealing head interacting cyclically between each other in such a way as to seal, between each other, the opposed walls of the tubular envelope at a sealing area provided between each pair of adjacent products and, at the same time, to cut the tubular envelope in each transversal sealing area in order to obtain the above-mentioned single envelopes hermetically sealed enclosing, each, one respective product.

The above-mentioned known method for obtaining the sealing both of the longitudinal edges and the walls of the tubular envelope has a drawback due to, above all, the functioning speed of the machine. In fact, when the speed increases, the time available for the sealing decreases, and therefore it is necessary to increase the temperature of both the rollers and the sealing heads, but with the films of wrapping material currently used which have a relatively thin thickness, the risk of burning or of completely melting the films themselves is greater. This problem also makes the machine rigid, in that the speed reached can no longer be reduced, otherwise the film will surely melt, also taking into account that the thermal inertia of the sealing elements is difficult to control.

Regarding the sealing of the longitudinal edges, in order to eliminate a similar drawback, more pairs of sealing rollers have been used which are positioned one next to the other along a feeding line in such a way that the sealing of the film comes about gradually. In this way, it has been possible to increase the sealing times, the functioning speed being the same and without increasing the temperature of the single rollers, but, at the same time, the structure of the machine has become considerably complicated, thus causing an increase of the production and maintenance costs. Furthermore, in this case the solution would only be partial since the tubular envelope has to be sealed also transversally so as to define the single packets.

SUMMARY OF THE INVENTION

The object of the present invention is to provide a method which permits to eliminate, in a simple and economic way, the drawbacks described above.

The stated object is realized in a method for the sealing of a film of material for wrapping products in packaging machines, the method comprising the steps of feeding the film along a packaging line wrapped about the products fed in an ordered sequence and arranged at predetermined constant intervals along the same packaging line making a tubular shape envelope wherein at least two types of specific parts, are identified, respectively constituted by two overlapped longitudinal edges and by at least two opposed walls included between each pair of adjacent products, and to connect between each other the specific parts by means of heat sealing; the connecting phase comprises a further pre-heating phase of at least one of the two types of specific parts brushing them by means of a beam of radiant electromagnetic energy.

Furthermore, the present invention relates to an equipment for the sealing of films of wrapping material. According to the present invention, an equipment is provided for the sealing of a film of wrapping material in packaging machines, of products being fed in ordered sequence and arranged at predetermined constant intervals along a packaging line, the packaging machine comprising advancing means so as to feed the film, along the packaging line, wrapped about the products, thus making a tubular shape envelope wherein at least two types of specific parts are identified respectively constituted by two overlapped longitudinal edges and by at least two opposed walls included between each pair of adjacent products; the sealing equipment comprising a sealing unit for connecting the specific parts between each other by means of heat sealing, the equipment comprises means shaped in such a way so as to release a beam of radiant electromagnetic energy in order to brush at least one of the two types of specific parts by pre-heating the type of part before it reaches the area of the respective sealing unit.

BRIEF DESCRIPTION OF THE DRAWINGS

The present invention will now be described in detail, by way of example, with the aid of the accompanying drawings, in which:

FIG. 1 is a schematic perspective view, with some parts removed so as to better evidence others, of a first preferred embodiment of the equipment of the present invention; FIG. 2 is a schematic plan view, with certain parts omitted for clarity, of a second preferred embodiment of the equipment in FIG. 1.

DESCRIPTION OF THE PREFERRED EMBODIMENTS

With reference to the accompanying drawings, the numeral 1 denotes, as a whole, a packaging machine of products 2 fed in an ordered sequence and arranged at predetermined constant intervals (not shown) along its packaging line 3. The packaging machine 1 comprises known means, not shown, for feeding a film 4 of wrapping material along the packaging line 3 in the direction F, and for wrapping it about the products 2, and thereby making a tubular shape envelope 6, and advancing means 5 (only shown in FIG. 2.) capable of moving the envelope 6 forward with the respective products 2. Along the packaging line 3, the products P are therefore spaced from each other, in such a way that the envelope 6 also wraps an empty space (not shown) which is created between each pair of adjacent products 2.

In the tubular envelope 6 obtained for folding the film 4, two different types of parts are therefore obtained destined to be connected between each other by means of heat sealing, in order to make the sealed packets 19 of the products 2. These parts of the envelope 6 will be referred to in the detailed description that follows as specific parts 7 and 8.

In particular, the envelope 6 is equipped with two overlapped longitudinal edges 7a, 7b, positioned below, which constitute the above mentioned specific parts 7 and, respectively, of two opposed walls 8a 8b positioned transversally to the envelope 6 between each pair of adjacent products 2 which constitute the above-mentioned specific parts 8. The opposed walls 8a, 8b are therefore found located in the above-mentioned empty spaces. The advancing means 5, for example a pair of rollers, are normally positioned under the packaging line 3 and they act on the overlapped edges 7a, 7b.

Downstream from the advancing means 5, a first sealing equipment 9 is provided for the sealing of the specific parts 7 of the film 4, or for the longitudinal sealing of the overlapped edges 7a, 7b of the tubular envelope 6. Downstream from the first sealing equipment 9, a pair of folding rollers and a second sealing equipment 23 are provided for the sealing of the specific parts 8, or for the transversal sealing of the film 4 at the opposed walls 8a, 8b of the tubular envelope 6. In this transversal sealing phase, the part of the tail end of the packet 19 positioned downstream is made and separated from the part of the head end 19a of the packet 19 positioned upstream with respect to the advancement direction F along the packaging line 3.

In the description that follows, the sealing equipment 9 and 23 will be described, following their position order along the packaging line 3 of the packaging machine 1.

With reference, in particular, to FIG. 2, the sealing equipment 9 comprises a source 10 of radiant electromagnetic energy, and a sealing unit 11. The sealing unit 11 includes a pair of rollers 12 which are substantially in mutual contact and heated, which carry out the sealing of the longitudinal edges 7a and 7b of the envelope 6.

The source 10 is capable of releasing a beam 13 of radiant electromagnetic energy which, as will be described in detail in what follows, through appropriate reflection 14 and focusing 115 means, can be exclusively directed towards the specific parts 7 to be sealed and it can be moved along and with respect to those specific parts in such a way as to brush them on all of their surface. The beam 13 released by the source 10 is capable of increasing the temperature of the specific parts 7 until reaching the best possible temperature value in order to permit their subsequent heat sealing by means of the rollers 12. The temperature reached by the specific parts 7 under the action of the beam 13 is lower by a delta t value than the best possible temperature for the sealing of the specific parts 7 by the the rollers 12 rotating at a predetermined angular speed. That delta t temperature difference corresponds to the heat quantity that the heated rollers 12 are capable of appropriately transmitting to the specific parts 7, during the short period of time in which they are in contact with the specific parts 7 during the phase of their connection by means of heat sealing. In actual practice, the source 10 will brush the specific parts 7 with its own beam 13 and it will increase the temperature to a predetermined value. Subsequently, the rollers 12 will come into contact with the same specific parts 7 and they will increase their temperature by the envisaged delta t value until they cause their reciprocal heat sealing.

The electromagnetic energy released by the source 10 can be of different types. For example, it can be electromagnetic energy relative to the part of spectrum which borders with the limit of the red visible radiation or to the part of spectrum which borders with the limit of the violet visible radiation. In the first case, there will be, as conventionally known, a beam 13 of ultrared light and in the second case a beam 13 of ultraviolet light. As an alternative, the source 10 can be a source of laser beam.

Furthermore, the source 10 can be capable of releasing both a beam 13 of a punctiform type, and of a light-blade type. Both these types of sources 10 are shown as examples in the appended figures, wherein 10a denotes the punctiform source and 10b denotes the light-blade type source. Regardless of the type of source 10 used, as previously mentioned, reflection means 14 of the beam 13 towards the specific parts 7 are envisaged. Usually, the reflection means 14 are constituted by a mirror 15. The mirror 15 is interlocked to a pair of actuators (not shown) capable of making the mirror rotate about two axes 15a, 15b perpendicular between each other and the mirror reflects the beam 13 by means of a focusing lens 115 which is unitedly mobile with the mirror 15 itself. The focusing lens 115 is positioned and structured in such a way that its focus, punctiform in the case of the source 10a and linear in the case of the source 10b, is substantially found at the overlapped edges 7a, 7b in order to obtain the maximum pre-heating efficiency.

Always with reference to FIG. 2, wherein the source 10 has been illustrated relatively to the longitudinal sealing equipment 9, the mirror 15 relative to the punctiform source 10a is made to continuously oscillate about its own axis 15a in order to move the focus of the respective focusing lens 115 along a line transversal to the overlapped longitudinal edges 7a, 7b themselves. The mirror 15, relative instead to the light-blade source 10b, is made to oscillate about its axis 15a depending on the amplitude of the light-blade which comes out from the respective focusing lens 115 with respect to the width of the longitudinal edges 7a, 7b.

Since the sealing of the longitudinal edges 7a, 7b is made during the advancement of the envelope 6 along the packaging line 3, the mirror 15 is also made to oscillate about its respective axis 15b in such a way as to brush one or more times the same parts of the overlapped longitudinal edges 7a, 7b by means of the beam 13, making the focus of the relative focusing lens 115 move forward and backwards along the overlapped longitudinal edges 7a, 7b themselves. In actual practice, the beam 13 will follow the overlapped edges 7a, 7b.

The oscillation of the mirror 15 about the axis 15b permits, as already mentioned, to brush more than once the same areas of the overlapped longitudinal edges 7a, 7b by means of the beam 13. In this way, the temperature of the overlapped longitudinal edges 7a, 7b can be raised further in the space of the same period of time so as to reduce the delta t temperature difference between the temperature value reached by the overlapped edges 7a, 7b at the end of the pre-heating phase and the value of the best possible sealing temperature of the same overlapped edges 7a, 7b. This means that the quantity of heat that the rollers 12 have to transmit to the overlapped longitudinal edges 7a, 7b during the sealing phase is reduced. This aspect is particularly interesting since it permits one to increase the advancement speed of the tubular envelope 6 much further than the actual limits. On the contrary, that is by increasing the delta t temperature difference, it is possible to intervene on the whole of the sealing phase whenever the packaging machine 1 moves at an operating speed which is lower than that of the standard running speed, for example during the transition periods before the starting or the stopping of the packaging machine 1, and increase the time of the rollers 12 remaining in contact with the overlapped longitudinal edges 7a, 7b. In the appended figures the numeral 16 denotes a control unit to which the source 10 and (in a way that is not illustrated) the movement actuators of the mirrors 15 are interlocked in order to establish the temperature value that the longitudinal edges 7a, 7b have to reach at the end of the pre-heating phase and in order to establish said delta t value.

With reference to FIG. 1, wherein the source 10, has been illustrated relative to the transversal sealing equipment 23 acting on the specific parts 8, it can be noted that the sealing equipment 23 comprises a source 10 capable of releasing a beam 13 of radiant electromagnetic energy, and a sealing unit 24. The sealing unit 24 is constituted by two sealing heads 19 rotating about axes which are parallel between each other. The two sealing heads 17 are equipped, along their generatrices, with a pair of sealers 18. Each pair of sealers 18 has an external surface which is substantially shaped as a cylinder sector and capable of completely covering a respective wall 8a or 8b of the tubular envelope 6.

Each pair of sealers 18 acts on the envelope 6 at the empty spaces which are to be found between two adjacent products 2. As already mentioned, and with reference to any one of the empty spaces between the two adjacent products 2, each pair of sealers 18 is designed to seal the "tail" of the packets 19 of the product 2 downstream and respectively the "head" of the packets 19 of the product 2 upstream (see FIG. 1 where, downstream from the sealing equipment 23, a product 2 wrapped in its packet 19 is shown). Between each pair of sealers 18 a blade 20, coupled to one of the sealing heads 17 and a corresponding counterblade 21 coupled to the other sealing head 17 are envisaged. Each blade 20 and the corresponding counterblade 21 separate the packet 19 already complete with the remaining envelope 6 as shown FIG. 1.

The source 10 is capable of releasing a beam 13 of radiant electromagnetic energy of a punctiform type or of a blade-light type, exactly as in the case of the longitudinal sealing equipment 9. As described with reference to FIG. 2, reflection means 14 constituted by a mirror 15 are provided. Furthermore, the mirror 15 is controlled by two actuators, not illustrated, to oscillate about two axes 15a, 15b which are perpendicular between each other. The mirror 15, as in the previous case, comprises a respective focusing lens 115. The source 10, different from what has already been described with reference to FIG. 2 and to the longitudinal sealing equipment 9, is intermittently activated in phase synchronism with the passage of the specific parts 8, or of the opposed walls 8a, 8b. In this case, the control unit 16 is connected to the sealing unit 24 in such a way as to guarantee the phase synchronism between the movement of the opposed walls 8a, 8b and the activation of the source 10. The mirrors 15 are moved exactly as already described with reference to FIG. 2 also as regards to the efficiency of tracking of the envelope 6 on behalf of the beam 13. In the appended figures, in order to point out the equality of the sources 10 for both the longitudinal 9 and transversal 23 sealing equipment, apart from the continuous or intermittent activation, the same reference has been made.

In the appended figures, the folding rollers 22 are also illustrated, which are positioned between the first sealing equipment 9 and the second sealing equipment 23 and they fold the overlapped longitudinal edges 7a, 7b already sealed under the envelope 6 and in close contact with it.

In addition, additional check and control means are also part of the packaging machine 1 and of the sealing equipment 9 and 23, which are not illustrated since they are not part of the present invention.

The functioning of the sealing equipment 9 and 23 can be easily inferred from what has been disclosed so far and therefore does not require further explanation.

What is claimed is:

1. A method for sealing a film of electromagnetic energy-sealable wrapping material about products, for packaging the products, comprising:

feeding a series of products along a path in an ordered sequence, with a space between each two succeeding products in the path;

feeding a film of electromagnetic energy-sealable wrapping material along said path with said series of products, and wrapping the film transversely of the path to create a tube of film about the series of products such that two opposite longitudinal edge margins of the film are overlappingly juxtaposed at a first joint site which extends longitudinally of the path and a series of empty tubular segments of said film is provided, one between each two succeeding products in the path, as a succession of second joint sites;

preheating at least one of said first joint site and all of said second joint sites by irradiation using a beam of radiant electromagnetic energy;

connecting said two opposite longitudinal edge margins of the film to create a first joint at said first joint site; and flattening said tube within each of said empty tubular segments to thereby bring corresponding portions of said film within each of said empty tubular segments into facewise confrontation, and connecting respective said portions to create a succession of respective second joints at said second joint site.

2. The method of claim 1, wherein:
said preheating is accomplished by brushing respective areas of said film at least once by said beam of radiant electromagnetic energy.

3. The method of claim 2, wherein:
said preheating is accomplished by brushing respective areas of said film at least twice by said beam of radiant electromagnetic energy.

4. The method of claim 3, wherein:
said brushing is conducted continuously, in relation to said overlappingly juxtaposed two opposite longitudinal edge margins of said film.

5. The method of claim 3, wherein:
said brushing is conducted intermittently, so as to irradiate said tube in each said empty tubular segment, but not at each site where said tube wraps around a product.

6. The method of claim 1, wherein:
said beam of radiant electromagnetic energy is constituted by a beam of radiation which borders the limit of visible red radiation.

7. The method of claim 1, wherein:
said beam of radiant electromagnetic energy is constituted by a beam of radiation which borders the limit of visible violet radiation.

8. The method of claim 1, wherein:
said beam of radiant electromagnetic energy is constituted by a heating laser beam.

9. Apparatus for sealing a film of electromagnetic energy-sealable wrapping material about products, for packaging the products, comprising:

a feeder for feeding a series of products along a path in an ordered sequence, with a space between each two succeeding products in the path;

a feeder for feeding a film of electromagnetic energy-sealable wrapping material along said path with said series of products, and wrapping the film transversely of the path to create a tube of film about the series of products such that two opposite longitudinal edge margins of the film are overlappingly juxtaposed at a first joint site which extends longitudinally of the path and a series of empty tubular segments of said film is provided, one between each two succeeding products in the path, as a succession of second joint sites;

a preheater for preheating at least one of said first joint site and said second joint sites by irradiation using a beam of radiant electromagnetic energy;

a connecting mechanism for connecting said two opposite longitudinal edge margins of the film to create a first joint at said first joint site; and a flattening and connecting mechanism for flattening said tube within each of said empty tubular segments to thereby bring corresponding portions of said film within each of said empty tubular segments into facewise confrontation, and connecting respective said portions to create a succession of respective second joints at same second joint site.

10. The apparatus of claim 9, said preheater includes:

a source of radiant electromagnetic energy for providing said beam; and at least one deflector arranged to intercept said beam and thereby to redirect said beam towards said at least one of said first joint site and all of said second joint sites.

11. The apparatus of claim 10, wherein:

said source is arranged to provide said beam as a punctiform beam; and said at least one deflector is arranged to redirect said beam in at least two directions which are inclined relative to one another, for thereby brushing respective areas of said film at least once by said beam of radiant electromagnetic energy.

12. The apparatus of claim 10, wherein:

said source is arranged to provide said beam as a blade-shaped beam having a direction of elongation and said at least one deflector is arranged to redirect said beam in a direction which is at right angles to said direction of elongation.

13. The apparatus of claim 10, wherein:

said preheater is arranged to operate continuously thereby to irradiate said overlappingly juxtaposed two opposite longitudinal edge margins of said film at a location on said path.

14. The apparatus of claim 10, wherein:

said preheater is arranged to operate intermittently, thereby to irradiate said tube in each said empty tubular segment, but not at each site where said tube wraps around a product.

15. The apparatus of claim 13, wherein:

said at least one deflector includes a deflector arranged to be oscillated about both two mutually orthogonal axes.

16. The apparatus of claim 14, wherein:

said at least one deflector includes a deflector arranged to be oscillated about a single axis.

17. The apparatus of claim 9, wherein:

said beam of radiant electromagnetic energy is constituted by a beam of radiation which borders the limit of visible red radiation.

18. The apparatus of claim 9, wherein:

said beam of radiant electromagnetic energy is constituted by a beam of radiation which borders the limit of visible violet radiation.

19. The apparatus of claim 9, wherein:

said beam of radiant electromagnetic energy is constituted by a heating laser beam.

\* \* \* \* \*